United States Patent
Desmond et al.

(10) Patent No.: US 6,493,434 B1
(45) Date of Patent: *Dec. 10, 2002

(54) UPDATE OF WEB AUDIO MESSAGES VIA AUDIO USER INTERFACE

(75) Inventors: Martha Desmond, Cranford, NJ (US); Karrie Jo Hanson, Westfield, NJ (US); Bethany Scott Robinson, Lebanon, NJ (US); Nancy Gannett Vickers, Westfield, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,030

(22) Filed: Feb. 24, 1998

(51) Int. Cl.[7] ........................ H04M 1/64; H04M 1/24; H04M 3/42

(52) U.S. Cl. .................. 379/88.17; 379/76; 379/88.13; 379/15.03; 379/114.28; 379/201.12

(58) Field of Search ....................... 379/67.1, 76, 88.11, 379/88.12, 878.13, 88.14, 88.17, 88.18, 93.12, 93.15, 93.25, 101.01, 114.28, 114.29, 201.01, 201.05, 201.12, 908, 15.02, 15.03; 364/410, 514 R; 395/200.47, 200.01, 200.02; 705/14; 709/204, 227, 228; 370/352, 356, 400

(56) References Cited

U.S. PATENT DOCUMENTS

| 5,341,350 A | * | 8/1994 | Frank et al. ................ 369/30 |
|---|---|---|---|
| 5,355,302 A | * | 10/1994 | Martin et al. ................ 364/410 |
| 5,568,540 A | * | 10/1996 | Greco et al. ................ 379/88 |
| 5,572,643 A | * | 11/1996 | Judson ................ 395/793 |
| 5,710,884 A | * | 1/1998 | Dedrick ................ 395/200.47 |
| 5,726,909 A | * | 3/1998 | Krikorian ................ 364/514 R |
| 5,751,961 A | * | 5/1998 | Smyk ................ 395/200.47 |
| 5,855,007 A | * | 12/1998 | Jovicic et al. ................ 705/14 |
| 5,881,131 A | * | 3/1999 | Farris et al. ................ 379/27 |
| 5,884,032 A | * | 3/1999 | Bateman et al. ................ 395/200.34 |
| 5,884,262 A | * | 3/1999 | Wise et al. ................ 704/270 |
| 5,930,765 A | * | 7/1999 | Martin ................ 705/14 |
| 5,953,392 A | * | 9/1999 | Rhie et al. ................ 379/88.13 |
| 6,044,403 A | * | 3/2000 | Gerszberg et al. ................ 709/225 |

\* cited by examiner

Primary Examiner—Allan Hoosain
(74) Attorney, Agent, or Firm—Morgan & Finnegan, LLP

(57) ABSTRACT

A method and system are disclosed for updating announcements on a packet network site such as a website. An exemplary method includes receiving an announcement through an audio interface and storing the announcement on a website server. In accordance with the exemplary method, merchants without Internet access can now update announcements on their websites quickly and economically by using an audio interface such as a conventional telephone. The updated announcements may be either audio or data. If the announcement received in the exemplary method is an audio announcement, it is converted from a first audio format into a second audio format prior to the step of storing the announcement. Whether the announcements are audio or data, the merchants' customers can then retrieve them by accessing the merchants' websites via the Internet.

22 Claims, 7 Drawing Sheets

UPDATE OF WEB AUDIO MESSAGES VIA AUDIO USER INTERFACE

FIELD OF THE INVENTION

The present invention relates to the creation and retrieval of audio information and more specifically relates to audio capture and retrieval over a network utilizing an audio user interface.

BACKGROUND OF THE INVENTION

The amount of information available over communication networks is tremendous and growing at a fast rate. The most popular of such networks is the Internet, which is a network of linked computers around the world. Much of the popularity of the Internet may be attributed to the World Wide Web (WWW) portion of the Internet. The WWW is a part of the Internet in which information is typically passed between server computers and client computers using Hypertext Transfer Protocol (HTTP). A server stores information and serves (i.e. sends) the information to a client in response to a request from the client. The client executes computer software programs, often called browsers, which aid in the requesting and displaying of information. Examples of WWW browsers are Netscape™ Navigator™, available from Netscape Communications, Inc., and the Internet Explorer™, available from Microsoft Corporation.

Servers, and the information stored therein, are identified through Uniform Resource Locators (URL). URL's are described in detail in Berners-Lee, T., et al., *Uniform Resource Locators*, RFC 1738, Network Working Group, 1994, which is incorporated herein by reference. For example, the URL http://www.hostname.com/document1.html, identifies the document "document1.html" at host server "www.hostname.com". Thus, a request for information from a host server by a client generally includes a URL. The information passed from a server to a client is generally called a document. Such documents are generally defined in terms of a document language, such as Hypertext Markup Language (HTML). Upon request from a client, a server sends an HTML document to the client. HTML documents contain information which is used by the browser to display information to a user at a computer display screen. An HTML document may contain text, logical structure commands, hypertext links, and user input commands. If the user selects (for example by a mouse click) a hypertext link from the display, the browser will request another document from a server.

A user may also access audio files through a browser. Conventional browsers typically include the capability to process and play audio files. Currently, the typical scenario for placing audio files on a server is that a web page creator (i.e., webmaster) would record a sound file on a computer (using microphone and sound card) and then place the file in the appropriate place on the server. Further, software has been written so that if a merchant (i.e., owner of content) has a computer and Internet access, he could record sound on his computer and upload it to the web server. However, many merchants do not have Internet access. These merchants therefore must work through a webmaster to make changes to the website. For businesses which require frequent updates to their websites, this can be a time consuming and expensive process.

SUMMARY OF THE INVENTION

A technical advance is achieved in the art by providing a method and system for updating announcements on a website. The method and system include receiving an announcement through an audio interface and storing the announcement on a website server. Merchants without Internet access can now update announcements on their websites quickly and economically by using an audio interface such as a conventional telephone. The updated announcements may be either audio or data. If the announcement is an audio announcement, it is converted from a first audio format into a second audio format prior to the step of storing the announcement. Whether the announcements are audio or data, the merchants' customers can then retrieve them by accessing the merchants' websites via the Internet.

DETAILED DESCRIPTION

The embodiments of the present invention provide merchants with the capability to update their Internet sites (i.e, web pages) using only an audio interface such as a telephone.

Figure 1:
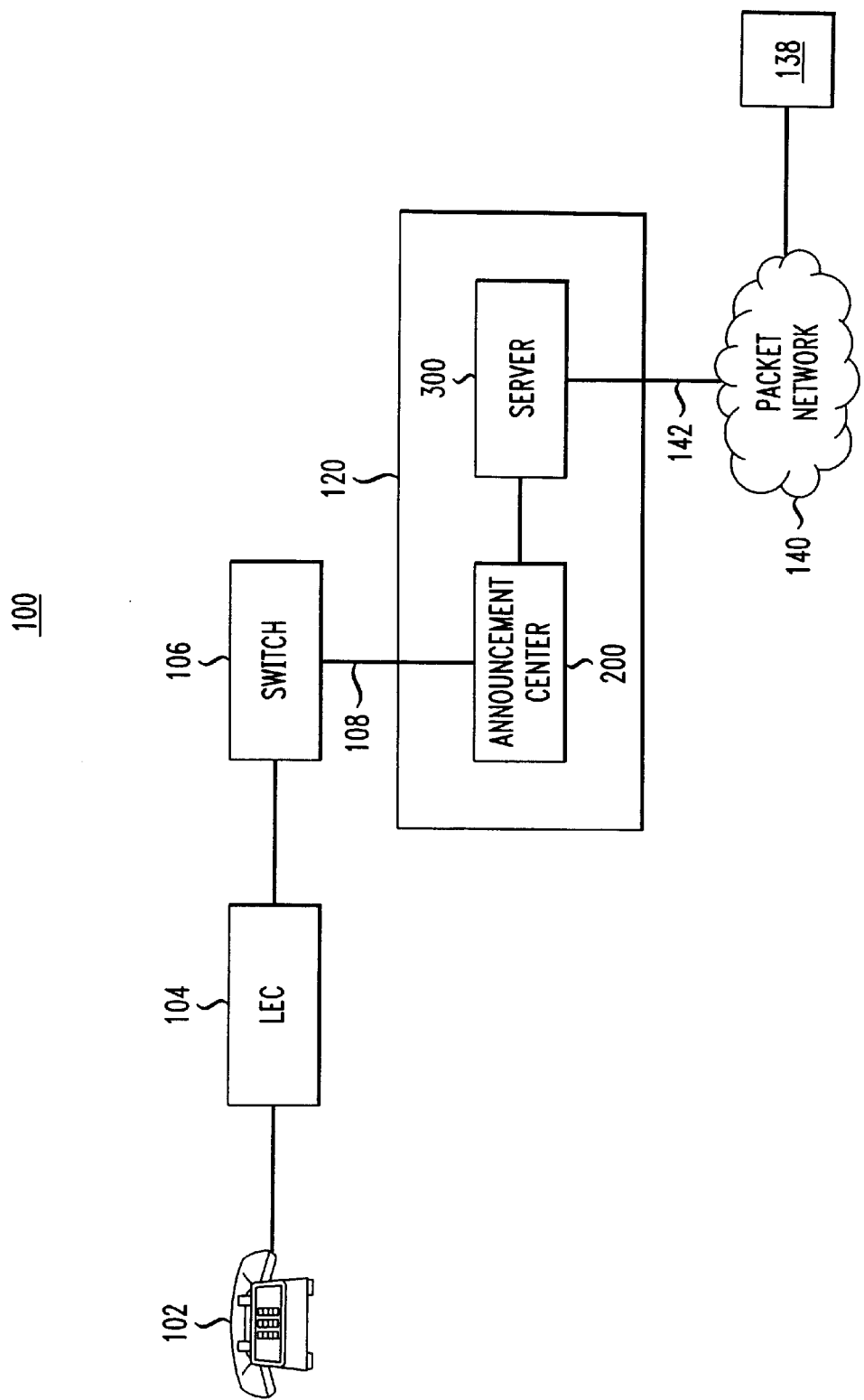
FIG. 1 illustrates a block diagram of a telecommunications system incorporating an exemplary embodiment.

With reference to FIG. 1, a block diagram is illustrated in accordance with an exemplary embodiment of the present invention. It should be recognized that FIG. 1 may include other components, which have not been shown in order to simplify the figure and which are not necessary for an understanding of the exemplary embodiments disclosed herein.

FIG. 1 shows a diagram of a telecommunications system 100 which is suitable to practice an embodiment of the present invention. An audio interface device 102 (which is typically a telephone) is connected to a local exchange carrier (LEC) 104. In accordance with the present embodiment, a client or merchant at the audio interface device 102 places a call to a telephone number associated with a service provider 120. The call is routed through LEC 104 and switch 106 and through link 108 to the service location 120. The routing of calls through a telecommunications network is well known in the art and will not be described further herein.

The service location 120 provides the "announcement center" 200 and audio upload capabilities to a server 300. The announcement center 200 and web server 300 will be described in greater detail below. The service location 120 is connected to a packet network 140 (e.g., the Internet)

through link 142. Although the Internet is being used for exemplary purposes, the present embodiment may be used with other types of packet networks. Link 142 comprises a socket connection over TCP/IP, the establishment of which is well known in the art. For additional information on TCP/IP, see Comer, Douglas, *Internetworking with TCP/IP: Principles, Protocols, and Architecture,* Englewood Cliffs, N.J., Prentice Hall, 1988, which is incorporated herein by reference. A customer would then use a computer 138 to access the merchant's website on the server 300 through the packet network 140.

In the exemplary embodiment, the ability to leave announcements at the announcement center 200 is provided only to merchants who are subscribers to a special service offered by the service location 120. The merchants may include users who need to change information frequently on their website but do so through a webmaster because they do not have direct access to a computer themselves. An example may be a restaurant which wants to announce the daily specials which will be changed every day.

The announcement center 200 will provide an audio interface between the merchant using audio interface device 102 and the server 300. The server 300 is a computer that services a customer or client. In a World Wide Web (WWW) embodiment, server 300 is a web server. The server 300 may be local to the announcement center 200 (i.e., in the same location as the announcement center 200) or it may be located at a remote site.

Figure 2:
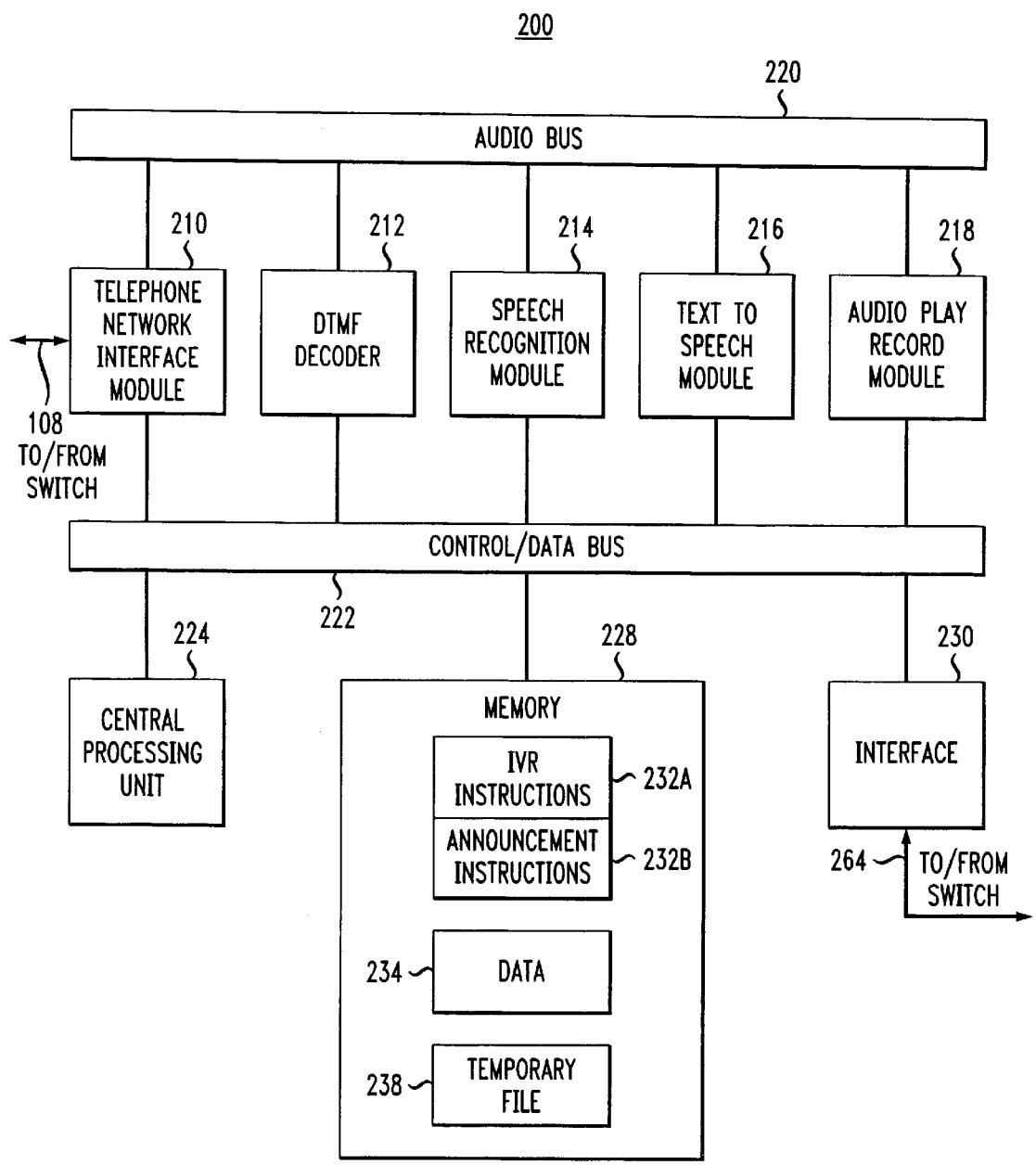
FIG. 2 illustrates a block diagram of the components of an announcement center.

Further details of the announcement center 200 are illustrated in FIG. 2. (Note that the announcement center 200 and the server 300 will be implemented using many of the devices described in U.S. patent application Ser. No. 08/635,801, filed on Apr. 22, 1996, and assigned to AT&T and which is hereby incorporated by reference).

The announcement center 200 utilizes an interactive voice response (IVR) system with software which operates the telephone network interface module 210, a DTMF decoder/generator 212, a speech recognition module 214, a text to speech module 216, and an audio play/record module 218, each of which is connected to an audio bus 220, and a control/data bus 222.

The overall functioning of the announcement center 200, including the operation of the IVR system, is controlled by the central processing unit 224. Central processing unit 224 operates under control of executed computer program instructions 232A and 232B which are stored in memory unit 228. Memory unit 228 may be any type of machine readable storage device. For example, memory unit 228 may be a random access memory (RAM), a read only memory (ROM), a programmable read only memory (PROM), an erasable programmable read only memory (EPROM), an electronically erasable programmable read only memory (EEPROM), a magnetic storage media (i.e., a magetic disk), or an optical storage media (i.e., a CD-ROM). Further, the announcement center 200 may contain various combinations of machine readable storage devices, which are accessible by the central processing unit 224, and which are capable of storing a combination of computer program instructions 232A and 232B and data 234. 232A designates instructions that control the overall operation of the IVR system and 232B designates announcement instructions that specifically control the operation of the announcement service. The announcement instructions 232B are scripts written in, but not limited to, a combination of Standard Generalized Markup Language (SGML), HTML, C++, and PERL.

The telephone network interface module 210 controls the low level interaction between the announcement center 200 and telephone network switch 106. In one embodiment, module 210 consists of one or more analog tip/ring loop start telephone line terminations. Through module 210, central processing unit 224 is able to control link 108 via control data bus 222. Signaling can be in-band or out-of-band. The DTMF decoder/generator 212 handles the conversion of DTMF tones into digital data and the generation of DTMF tones from digital data. The speech recognition module 214 performs speech recognition of speech signals originating at user telephone 102 and received over the audio bus 220. Such speech signals are processed and converted into digital data by the speech recognition module 214. The text to speech module 216 converts text of documents received from memory 228 to a form suitable for playing over the telephone. It is noted that each module 210, 212, 214, 216, and 218 is shown as separate functional modules in FIG. 2. The functionality of each of the modules 210, 212, 214, 216, and 218 may be implemented in hardware, software, or a combination of hardware or software, using well-known signal processing techniques. The packet network interface 230 is used for communication between the announcement center 200 and the server 300.

Figure 3:
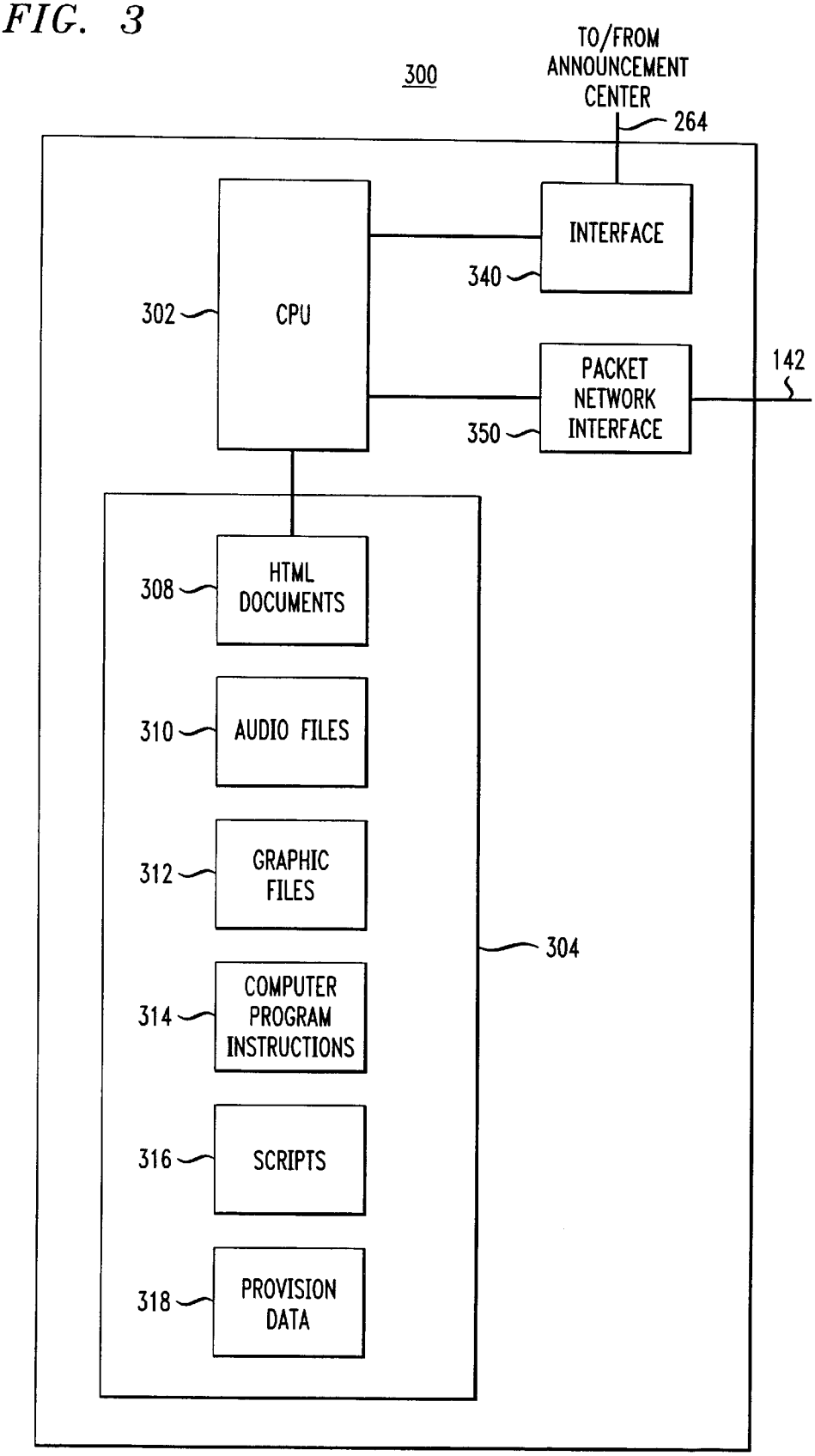
FIG. 3 illustrates a block diagram of the components of a server.

Server 300 is shown in detail in FIG. 3. Server 300 is a computer containing a central processing unit 302 connected to a memory 304. The functions of the server 300 are controlled by the central processing unit 302 executing computer program instructions 314 stored in memory 304. In operation, the audio file is sent to the server 300 from interface 230 and received by interface 340. The central processing unit 302 interprets the audio file and stores the audio file in the audio files section 310 of the memory 304. The memory 304 also stores other types of information used in the formation of a web page. The memory 304 further includes HTML documents 308 and graphic files 312. HTML documents 308 are well known and contain conventional HTML instructions for use in conventional WWW graphical browsers. As previously discussed, the audio files 310 are files which contain audio information. Graphic files 312 are files which contain graphic information. Memory 304 may also contain scripts 316 for dynamically generating HTML documents.

Figure 4:
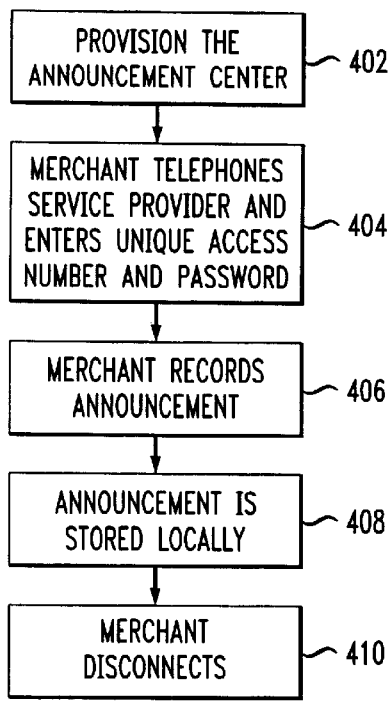
FIG. 4 illustrates a flowchart showing the merchant accessing the announcement center and creating an audio announcement.

FIG. 4 illustrates a flowchart showing the steps performed when a merchant accesses the announcement center and leaves an announcement. The first step 402 is a provisioning step in which the merchant is given the phone number of the announcement center 200 at the service location 120, a unique access number for the particular merchant, and a password to protect against unauthorized access. Also, in the provisioning step, the merchant will direct the service location 120 on the legend (i.e., headings) that the merchant wants to correspond to the announcement that will be left with the service location 120. For example, if the merchant is a restaurant, the legend pointing to the updatable announcement might state "Daily Specials." The provisioning information may be temporarily stored in memory 228 and then later forwarded to 318.

To record an announcement, the merchant calls the announcement center 200 and enters the merchant's access number and password in step 404. As shown in step 406, the merchant records an audio announcement (i.e., such as the daily special) and then in step 408, the audio announcement is temporarily stored locally in file 238 in a first audio format (e.g., mulaw) in the announcement center 200. The merchant may also delete and/or listen to the current audio announcement after it has been recorded. The merchant may then disconnect in step 410 or, the merchant may remain on the line while the audio announcement is being processed and stored on the server 300.

In an alternate embodiment, there may also be multiple audio announcements stored for each merchant as specified during provisioning. The merchant would then have to specify via touch tones which announcement he wanted to update (i.e., "press 1 to update your first announcement, . . . ").

Figure 5:
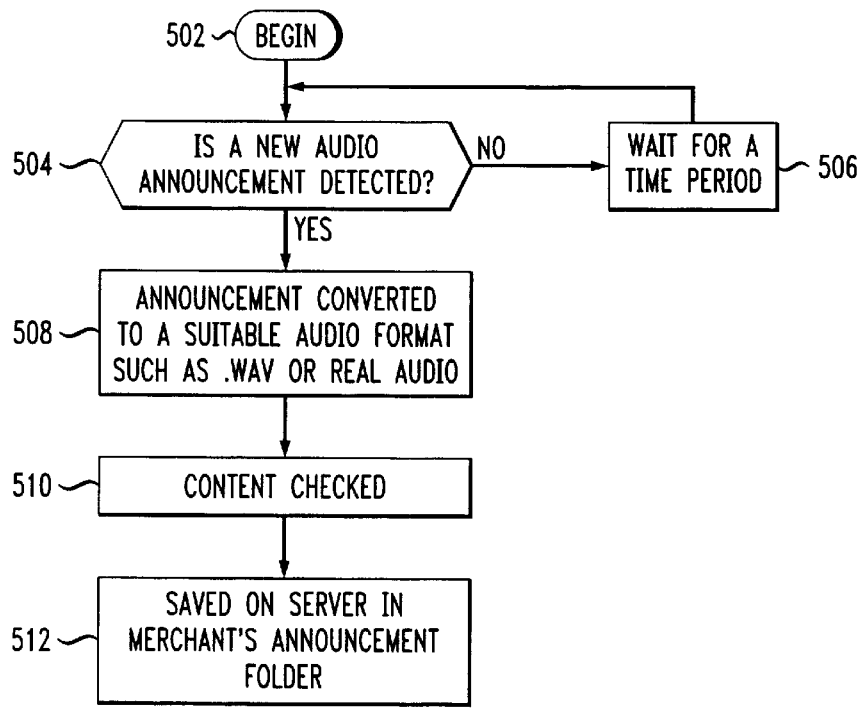
FIG. 5 illustrates a flowchart showing the announcement center transferring the audio announcement to the server.

FIG. 5 is a flowchart illustrating the process by which the announcement center 200 checks for an announcement and saves the announcement on the server 300. The CPU 224 in the announcement center 200 will check for temporarily stored announcements in step 502 and will determine in step 504 if a new announcement has been received. If a new announcement is not detected, then the CPU 224 will wait for a time period in step 506 (e.g., a minute) and check again. Alternatively, a process running on the CPU could receive notification when a new announcement is recorded and then begin processing. If a new announcement is detected, the CPU 224 in step 508 will convert the announcement from mulaw to a second suitable format such as .WAV or RealAudio™. .WAV is the standard Windows wave file sound format and RealAudio™ is a plug-in for music and voice which allows a sound file to be played as it is being transferred (i.e., streaming).

After the audio announcement has been converted into a suitable format, in optional step 510, the content of the announcement may then be checked either manually by the operator of the service location 120 or automatically by the CPU 224 using a software program which conducts a "wordspotting" search to determine if the audio announcement contains improper material such as slanderous remarks, obscenities, mistakes, etc.

In step 512, the checked announcement may then be sent to the server 300 and stored on the server 300 in an audio file 310 in the merchant's directory or announcement folder in memory 304.

Figure 6:
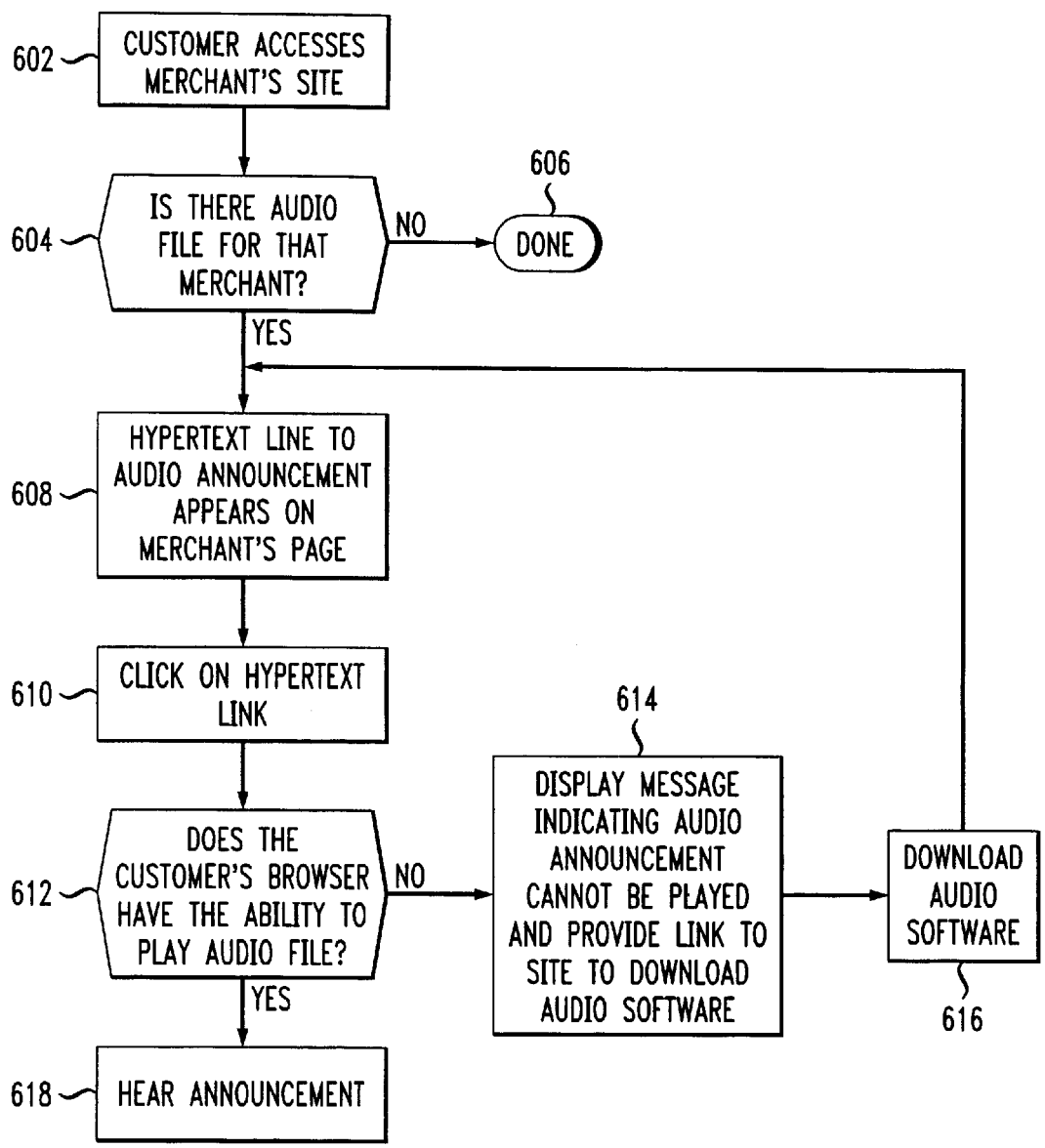
FIG. 6 illustrates a flowchart showing a customer accessing the merchant's audio announcement.

FIG. 6 shows the steps when a customer uses a computer (reference numeral 138 in FIG. 1) to access the merchant's website through the packet network 140 (i.e., the Internet). The customer using a conventional graphical browser such as Netscape™ Navigator™ or Microsoft™ Internet Explorer™ will click on a link or enter an address to arrive at the merchant's website in step 602.

When a customer accesses the merchant's website, the webpages are generated by the server 300 differently depending on whether or not the webpages include an audio announcement. If there is no audio announcement, then the webpage will not contain a hypertext link to an audio file. Instead, the area on the merchant's webpage reserved for the hypertext link will be blank. Accordingly, in step 606, the customer is "finished" for purposes of the present invention. However, if there is an audio announcement, in step 608, a hypertext link(s) will appear in the HTML documents on the merchant's webpage 608.

When displayed on the screen of the computer (138 in FIG. 1) executing a conventional graphical browser, a hypertext link will be graphically identified (e.g., underlined). If a customer selects a link, for example by clicking on the link with a mouse, then the browser generates a request for the document indicated by the link and sends the request to the server 300. Therefore, if there is an audio announcement, the merchant's page, when processed by a conventional browser, will display legends chosen by the merchant during provisioning. The words "DAILY SPECIAL (WAV)" and "REALAUDIO" are examples of such legends and they would be displayed in the following hypertext manner:

DAILY SPECIAL (WAV) REALAUDIO

The customer would then select one of the links in step 610 using a graphical pointing device such as a mouse. If the customer selects the link DAILY SPECIAL (WAV), then the browser would generate a request for the document which is stored as a .WAV file. If the customer's browser is compatible with .WAV, then the customer will hear the audio in step 618. If the customer's browser is not compatible with .WAV, then in step 614 the browser will display a message indicating that the audio announcement cannot be played and will also display a hypertext link to a site which allows the .WAV plug-in to be downloaded. In step 616, the audio software is downloaded and the customer will then be able to click back to the merchant's site and hear the announcement in step 618. Alternatively, if the customer selects the link REALAUDIO then the browser would generate a request for the document which is stored as a REALAUDIO™ file. If the customer's browser contains the REALAUDIO™ plug-in, then the customer will hear the audio announcement in step 618. If the customer's browser is not compatible with REALAUDIO™, then in step 614 the browser will display a message indicating that the audio announcement cannot be played and will also display a hypertext link to a site which allows the REALAUDIO™ plug-in to be downloaded. In step 616, the audio software is downloaded and the customer will then be able to click back to the merchant's site and hear the announcement in step 618. In alternative embodiments, other audio formats besides .WAV and REALAUDIO™may be implemented.

Figure 7:
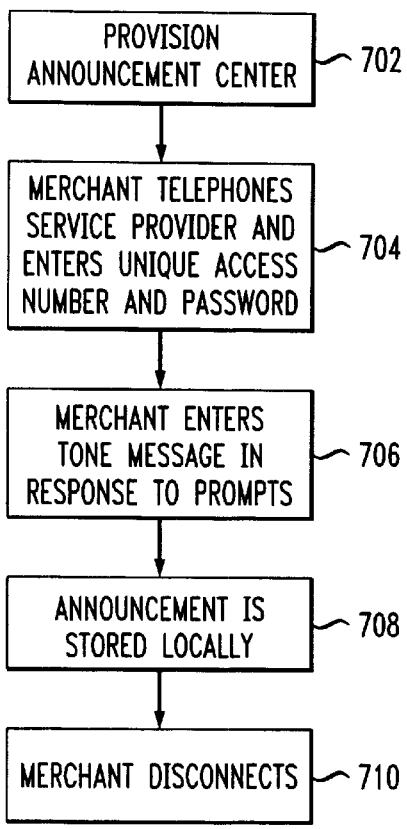
FIG. 7 illustrates a flowchart showing the merchant accessing the announcement center and entering a data announcement.

In an alternative embodiment, as described in FIG. 7, the merchant may leave a data announcement using the touch tone keypad of the telephone 102. In this embodiment, the input at the telephone 102 by the merchant may be in the form of DTMF tones generated by the merchant pressing the keys on the keypad of an audio interface device such as a telephone 102. In step 702, the service provider 120 is provisioned with a password and unique access number set up for the merchant. During the provisioning step, an HTML file that designates how the announcement will appear on the merchant's website will be created for the merchant in the announcement center 200. For example, the merchant may want a row of 5 numbers each with a title above it. The merchant will then press 5 numbers into the system when entering information. When a customer looks at that merchant's page, the system will include the provisioned page with legends and the collected digits entered using the touch tone keypad. After the merchant dials the number of the service provider and enters the password and unique access number in step 704, the merchant will hear a series of prompts. The prompts are generated by a software program stored in the memory 228 at the announcement center 200 in FIG. 2. In step 706, the merchant enters the announcement through the touch tone keypads on the audio interface device (i.e., a telephone) 102 in response to the prompts. The announcement is then converted to digits and stored as text, in step 708, in a temporary file such as the file indicated by reference numeral 238 in FIG. 2. In step 710, the merchant may then disconnect by placing the receiver of the telephone 102 on-hook.

Figure 8:
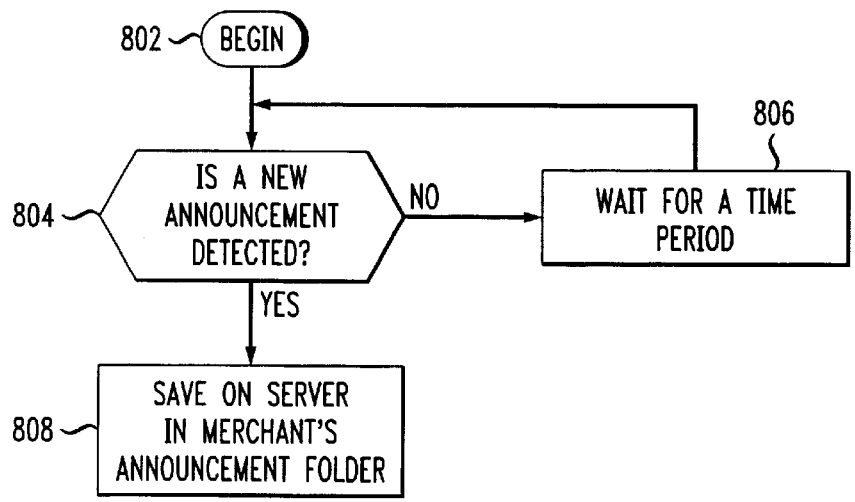
FIG. 8 illustrates a flowchart showing the announcement center transferring the data announcement to the server.

FIG. 8 illustrates a flowchart showing the announcement center transferring the data announcement to the server. In step 802, the CPU 224 at the announcement center 200 begins processing the data announcement. In step 804, the CPU 224 checks the message folder 238 in the merchant's directory to determine if a new data announcement has been left by a merchant. If a new data announcement has not been left by a merchant, the CPU 224 will wait for a predetermined period of time in step 806 and then check the message folder 238 again. If there is a new data announcement in message folder 238, the CPU 224 will save the data announcement on the server 300 in the merchant's announcement folder 808. Alternatively, a process running on the CPU 224 could receive a notification when a new announcement is recorded and, in response to the modification, begin processing the announcement.

Figure 9:
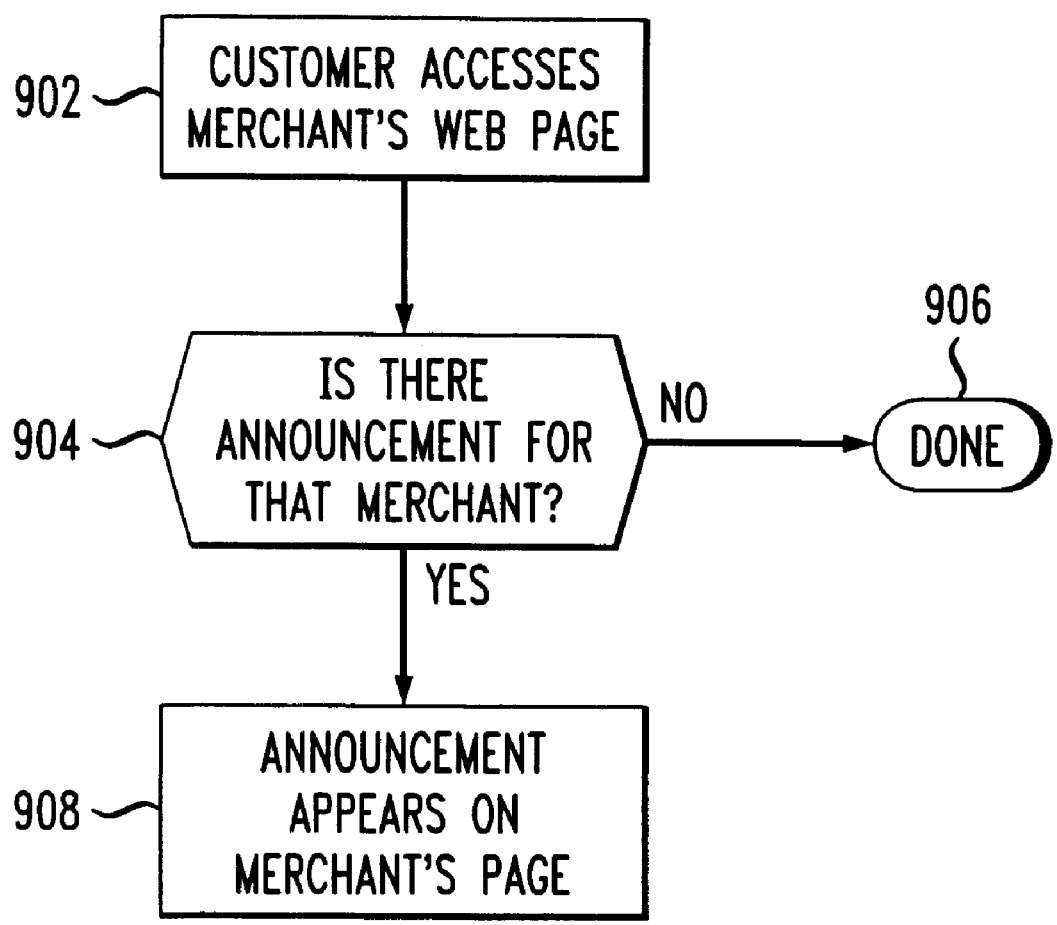
FIG. 9 illustrates a flowchart showing a customer accessing the merchant's site to obtain the data announcement.

FIG. 9 is a flowchart illustrating a customer accessing the merchant's website to obtain the data announcement. In step 902, the customer accesses the merchant's website. In step 904, the browser checks the merchant announcement folder to determine if there is a data announcement for that merchant. If there is no data announcement, the customer is "finished" in step 906 since there is no information to view at the site. If there is a data announcement, then in step 908 the data announcement appears on the merchant's page.

Although the present embodiment has been described with respect to a restaurant announcing daily specials, alternative embodiments could include general announcements such as school closings, store closings, school lunch menus, sales, sport scores, and games such as scavenger hunts with the announcements giving out clues. In these cases, the client would be the merchant and the users accessing the site would be the customers.

The foregoing is to be understood as being in every respect illustrative and exemplary, but not restrictive, and the scope of the invention disclosed herein is not to be determined from the Detailed Description, but rather from the claims as interpreted according to the full breadth permitted by the law. It is to be understood that the embodiments shown and described herein are only illustrative of the principles of the present invention and that various modifications may be implemented by those skilled in the art without departing from the scope and spirit of the invention.

What is claimed is:

1. A method of updating announcement on a website comprising:

receiving an audio announcement for temporary storage in an announcement center by a voice call from a telephone; and storing said audio announcement on a website server separate from said announcement center.

2. The method of claim 1, wherein the website server is in a location remote from the announcement center.

3. The method of claim 1, further comprising:

creating a hypertext link in a website indicating that the audio announcement is present.

4. The method of claim 1, further comprising:

storing the audio announcement in a temporary file in the announcement center.

5. The method of claim 1, further comprising:

determining if the audio announcement has been received at the announcement center.

6. The method of claim 1, further comprising:

provisioning the announcement center for receiving an audio announcement.

7. The method of claim 1, further comprising:

storing the audio announcement in a first audio format; and converting the audio announcement into a second audio format.

8. The method of claim 1, further comprising:

checking the content of the announcement.

9. A method of storing information received from an audio interface comprising the steps of:

receiving an audio announcement in an announcement center by a voice call from the audio interface device;

storing the announcement temporarily in a first audio format at the announcement center;

detecting to determine if the audio announcement has been received;

converting the audio announcement into a second audio format;

saving the audio announcement on a website server separate from said announcement center.

10. The method of claim 9, wherein the website server is in a location remote from the announcement center.

11. The method of claim 9, wherein the audio interface is a telephone.

12. The method of claim 9, wherein the second audio format is one of a group comprising .WAV or RealAudio.

13. The method of claim 9, further comprising:

checking the content of the audio announcement.

14. A system for storing information comprising:

an announcement center for receiving announcements for temporary storage by a voice call from a telephone, said announcement center having a CPU and a memory section, wherein said memory section includes announcement instructions for directing the CPU to process the announcements; and a website server coupled to said announcement center for storing said announcements, wherein said website server is separate from said a announcement center.

15. The system of claim 14, wherein said website server is in a location remote from the announcement center.

16. The system of claim 14, wherein said announcement instructions include provisioning information.

17. The system of claim 14, wherein said announcement center receives information from an audio interface device.

18. The system of claim 17, wherein the audio interface device is a telephone.

19. A system comprising:

means for receiving an audio announcement for temporary storage in an announcement center by a voice call from an audio interface device; and means generating a hypertext link in a client's documents on a website server indicating that the audio announcement is present, wherein said website server is separate from said announcement center.

20. The system of claim 19, wherein the website server is in a remote location from the announcement center.

21. The system of claim 19, wherein the audio interface device is a telephone.

22. The system of claim 19, further comprising:

means for converting the audio announcement from a first audio format into a second audio format.

* * * * *